United States Patent
Moris-Herbeuval et al.

[11] Patent Number: 5,585,064
[45] Date of Patent: Dec. 17, 1996

[54] VENTLESS SEGMENTED TIRE MOLD AND METHOD THEREFORE

[75] Inventors: Véronique Moris-Herbeuval, Arlon, Belgium; Raymond Merx, Junglinster, Luxembourg; Klaus Schmitt, Biesdorf, Germany; Helmut Dernbach, Cuyahoga Falls, Ohio; Craig D. Miller, Norton, Ohio; Bernard B. Jacobs, Akron, Ohio

[73] Assignee: The Goodyear Tire & Rubber Company, Akron, Ohio

[21] Appl. No.: 277,217

[22] Filed: Jul. 20, 1994

[51] Int. Cl.⁶ .................................................. B29C 35/00
[52] U.S. Cl. .......................... 264/501; 264/102; 264/326; 425/47
[58] Field of Search ..................................... 264/501, 101, 264/102, 315, 326; 425/47, 812

[56] References Cited

U.S. PATENT DOCUMENTS

| | | | |
|---|---|---|---|
| 3,682,576 | 8/1972 | Gross | 425/47 |
| 4,013,390 | 3/1977 | Moeller et al. | 425/47 |
| 4,289,463 | 9/1981 | Le Moullac | 425/47 |
| 4,573,894 | 3/1986 | Blayne et al. | 425/36 |
| 4,597,929 | 7/1986 | Blayne | 264/102 |
| 4,743,322 | 5/1988 | Holroyd et al. | 425/47 |
| 4,957,676 | 9/1990 | Greenwood | 264/102 |
| 5,141,424 | 8/1992 | Christof | 425/47 |
| 5,269,669 | 12/1993 | Ladouce | 425/47 |

Primary Examiner—Mathieu D. Vargot
Attorney, Agent, or Firm—Frederick K. Lacher

[57] ABSTRACT

An apparatus for providing a vacuum in a segmented tire mold includes an upper sidewall assembly and lower sidewall assembly, a plurality of radially moveable tread mold segments operable with the upper sidewall assembly and lower sidewall assembly to define a tire mold cavity. A conical actuating ring assembly surrounds the tire mold segments and engages the mold segments to provide radial movement of the mold segments. The apparatus includes a first seal between the conical actuating ring assembly and the lower mold assembly, as well as a second seal between the conical actuating ring and the upper sidewall assembly, thereby sealing the space defined by the tire mold so that a vacuum can be drawn on the tire mold cavity upon the closing of the mold.

12 Claims, 14 Drawing Sheets

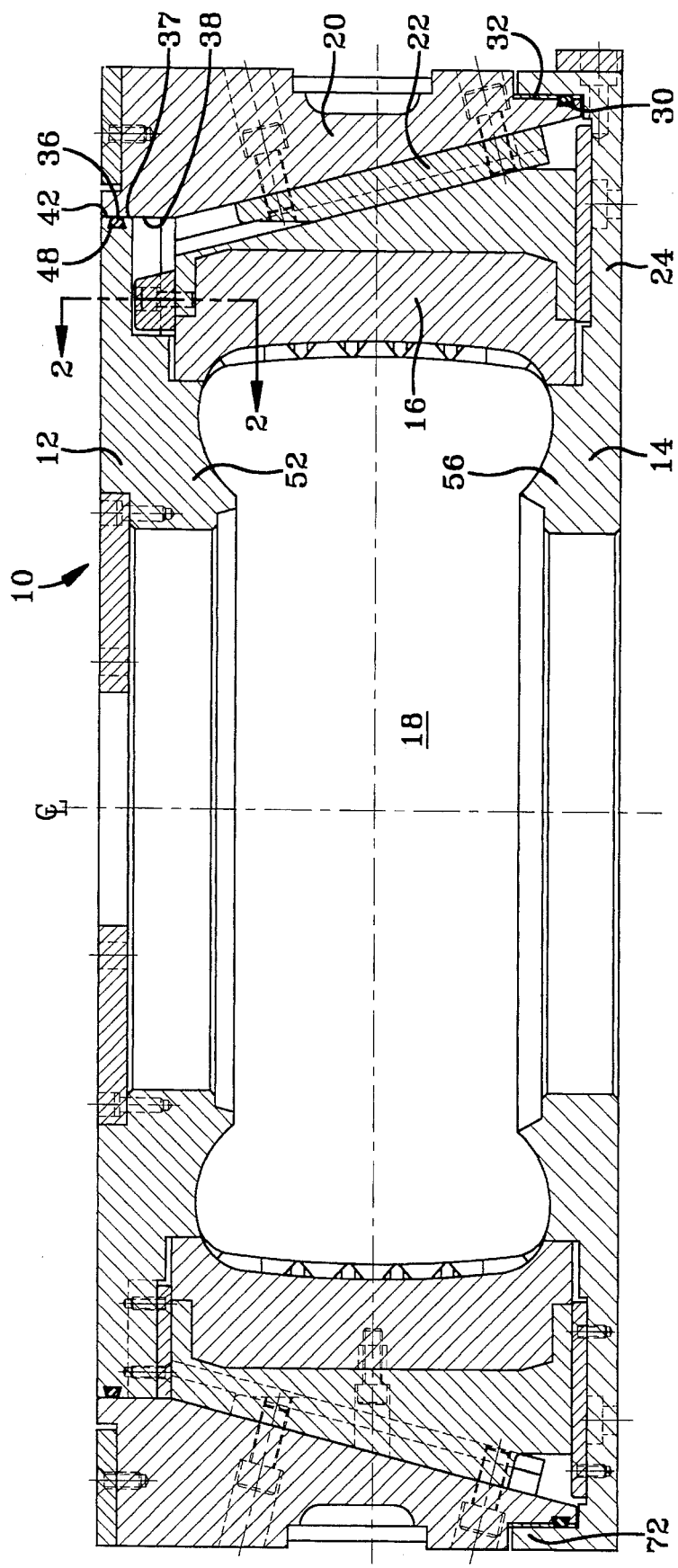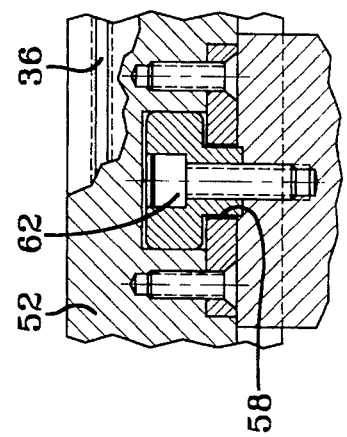

VENTLESS SEGMENTED TIRE MOLD AND METHOD THEREFORE

This invention relates to molds for producing tires and methods associated therewith, and more particularly to a tire mold having no vents.

Tires have long been manufactured by vulcanization within a tire mold. For example, in U.S. Pat. No. 4,957,656 of Greenwood, a two-piece tire mold featuring various seals and pressurized compartments is disclosed. Further, in British patent 830,231 of Dunlop Rubber Co., Ltd. another two-piece tire mold utilizing a vacuum is disclosed.

One form of tire mold which has gained popularity in recent years is the segmented tire mold, as opposed to a two-piece tire mold. Examples of segmented tire molds include U.S. Pat. Nos. 3,779,677 and 3,867,504, both of Greenwood.

Typical tire molds have small holes or vents to allow air trapped within the mold to escape. When the tire is vulcanized and removed from the mold, rubber that has been vulcanized within the vents in the mold extends outwardly from the surface of the tire in the form of burrs or extensions. These burrs detract from the tire's appearance and may be shaved from the tire as a final step in the tire manufacturing process. While the rubber burrs were a necessary result of the tire manufacturing process, they were undesirable for several reasons. First, the extensions were a waste of rubber. Second, they created an undesirable source of scrap material which must be collected and properly disposed of. Third, the removal of the burrs required an extra step in the tire manufacturing process, thus raising the cost of manufacturing the tire due to the extra space, labor and equipment required. Fourth, the cost of the molds was increased and the cost of cleaning the vents is substantial. Tires may be less expensive and more attractive in appearance when such burrs are eliminated.

One way to eliminate such rubber burrs is to vulcanize the tire in a ventless mold. An example of a ventless two-piece mold is shown and described in U.S. Pat. No. 4,573,894 of Blayne et al.

The present invention is directed to ventless segmented tire molds and various methods of using them. The ventless segmented tire molds and methods embodying the invention are simple in design, effective in use, and adaptable for production of tires on a commercial scale.

SUMMARY OF THE INVENTION

In accordance with the present invention, a new and improved segmented tire mold is provided which is ventless.

More particularly, in accordance with one aspect of the invention there is provided an apparatus for providing a vacuum in a segmented tire mold having an upper sidewall assembly and a lower sidewall assembly, a plurality of radially moveable tread mold segments operable with the upper sidewall assembly and the lower sidewall assembly to define a tire mold cavity in the closed position of the tire mold, a conical actuating ring assembly surrounding the mold segments and slidably engagable with the mold segments to provide radial movement of the mold segments into engagement with the upper sidewall assembly and the lower sidewall assembly, the apparatus comprising;

(a) a first sealing means between the actuating ring assembly and the lower sidewall assembly;

(b) a second sealing means between the actuating ring assembly and the upper sidewall assembly;

(c) the first sealing means and the second sealing means being operative to seal a space defined by the actuating ring assembly, the upper sidewall assembly, the lower sidewall assembly and an associated tire in the tire mold cavity; and, (d) means for communicating the vacuum to the space for removing gases from the tire mold cavity upon closing of the mold.

According to another aspect of the invention there is provided an apparatus wherein the upper sidewall assembly comprises an integral upper sidewall mold member and said second sealing means includes an O-ring on the upper sidewall mold member.

According to a further aspect of the invention there is provided an improved process for providing a vacuum for an uncured tire in a segmented tire mold having an upper sidewall assembly, a plurality of radially moveable tread mold segments cooperable with the upper sidewall assembly and a lower sidewall assembly to define a tire mold cavity, a conical actuating ring assembly surrounding and slidably engagable with the mold segments to provide radial movement of the segments into engagement with the upper sidewall assembly and the lower sidewall assembly comprising:

(a) positioning the uncured tire between the upper sidewall assembly and the lower sidewall assembly;

(b) moving the actuating ring assembly downwardly to urge the segments radially inwardly into engagement with the upper sidewall assembly and the lower sidewall assembly;

(c) providing a seal between the upper sidewall assembly and the actuating ring assembly;

(d) providing a seal between the lower sidewall assembly and the actuating ring assembly;

(e) communicating a vacuum to a tire mold cavity defined by the lower sidewall assembly, the upper sidewall assembly, and the segments;

(f) closing the tire mold while communicating the vacuum to the tire mold cavity;

(g) applying heat and pressure to the uncured tire for vulcanization thereof; and, (h) opening the tire mold for removal of the tire from the mold.

According to a still further aspect of the invention there is provided a method of installing a segmented tire mold in a vulcanizing press comprising the steps of:

(a) assembling tread mold segments in slide blocks;

(b) assembling retainers in place on the slide blocks;

(c) inserting retraction tees into tee slots in the upper sidewall assembly;

(d) installing a first O-ring over the upper sidewall assembly;

(e) suspending the upper sidewall assembly in position over the tread mold segments and slide blocks;

(f) sliding the tread mold segments and the slide blocks into place in the upper sidewall assembly;

(g) clamping the upper sidewall assembly with a clamp bar, thereby securing the tread mold segments and the slide blocks in place;

(h) installing a second O-ring in an actuating ring assembly;

(i) lowering the actuating ring assembly over the tread mold segments and slide blocks;

(j) installing stop bolts on the actuating ring assembly in engagement with the slide blocks;

(k) installing retraction tee bolts;

(l) removing the clamp bar from the upper sidewall assembly;

(m) suspending the upper sidewall assembly, tread mold segments and actuating ring assembly over a lower sidewall assembly and lowering the upper sidewall assembly until the upper and lower sidewall assemblies, tread segments and actuating ring assembly are in a fully closed position;

(n) installing shipping straps; and, (o) installing the assembly into the vulcanizing press.

(p) removing the shipping straps.

One advantage of the invention is the provision of a tire mold which does not require the shaving of burrs from a tire after it is removed from the mold, thereby saving a step in the manufacturing process and enabling the same quality of tire to be produced faster and more inexpensively.

Another advantage of the invention is the provision of a tire with an improved appearance.

Still other benefits and advantages of the invention will become apparent to those skilled in the art to which it pertains upon a reading and understanding of the following detailed specification.

DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 1 is cross-sectional view of one half of a ventless segmented tire mold according to the invention.

FIG. 2 is a cross-sectional view taken along line 2—2 of FIG. 1, illustrating one of the retainer tees.

DESCRIPTION OF THE PREFERRED EMBODIMENTS

Figure 3:
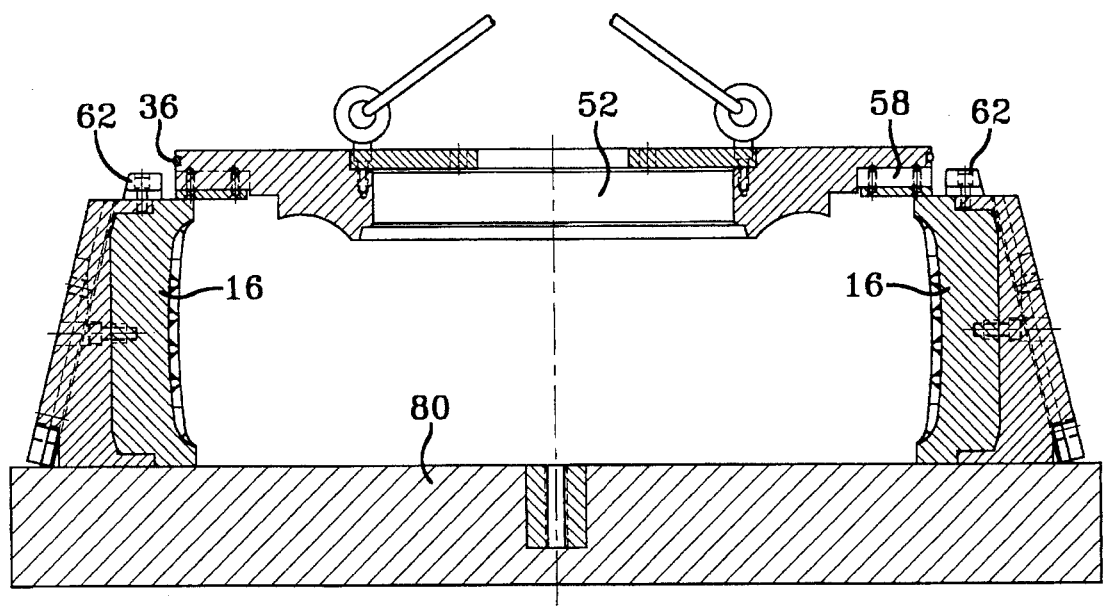
FIGS. 3–6 are schematic cross-sectional views illustrating steps in a method of installing a tire mold according to the invention.

Referring now to the drawings where the showings are for purposes of illustrating a preferred embodiment of the invention only and not for purposes of limiting the same, FIG. 1 is a cross-sectional view of a segmented tire mold 10 according to a preferred embodiment of the invention. Primary elements of the mold 10 include an upper sidewall mold assembly 12 and a lower sidewall mold assembly 14. In the embodiment shown in FIG. 1, the upper sidewall mold assembly 12 includes an upper sidewall mold plate 52. The lower sidewall assembly 14 includes a lower sidewall mold plate 56. The mold 10 further includes a tread mold segment 16. In a segmented tire mold, a plurality of tread mold segments 16 are radially moveable to assemble or disassemble the segmented tire mold 10 about the unvulcanized green tire. The operation of segmented tire molds is well-known in the art and will not be discussed further here.

In the embodiment shown in FIG. 1, one of the important elements of that design is the fact that the upper sidewall mold assembly 12 is comprised of only two members, an upper sidewall mold plate 52 and O-ring 36. The fact that the upper sidewall mold plate 52 is made of only one piece makes it impervious to air. Therefore, when coupled with O-ring 36, the upper sidewall mold plate 52 provides an air barrier which is important when a vacuum is to be drawn on a tire mold cavity 18.

The upper and lower sidewall mold assemblies 12, 14 respectively and tread mold segments 16 together define a tire mold cavity 18 within the tire mold 10. The tread segments 16 are moveable radially inwardly or outwardly along a sloped slide 22 in response to vertical movement by conical actuating ring 20. The actuating ring 20 is moveable in a generally axial direction relative to the tire within the tire mold 10, or vertically with reference to FIG. 1.

With continuing reference to FIG. 1, a first sealing means seals a gap between the actuating ring 20 and a lower mold member 24. In a preferred embodiment, the first sealing means includes an O-ring 30 and abutting bronze cylindrical surface 32 on the actuating ring 20. The abutting bronze surface 32 is affixed to the actuating ring and abuts the lower mold member.

A second sealing means seals a gap between the actuating ring 20 and the upper sidewall mold plate 52. In the embodiment shown in FIG. 1, the second sealing means comprises an O-ring 36 which abuts radially inner cylindrical surface 38.

With continuing reference to FIG. 1, the upper sidewall mold plate 52 has a radially outer cylindrical surface 42 which is in alignment with the radially inner cylindrical surface 38 of the actuating ring assembly 20. The inner cylindrical surface 38 may be of bronze or other suitable bearing material.

The O-ring 36 is disposed in a circumferential groove 48 in the outer cylindrical surface 42 of the upper sidewall mold plate 52 and is in sealing engagement with the inner cylindrical surface 38 of the actuating member 20 during the time the mold 10 is closed.

With reference to FIGS. 1 and 2, the tread mold segments 16 are connected to the upper sidewall mold member 52 by pocket type slots 58 which are closed at the top in the upper sidewall mold plate 52 and retainer tee members 62 on the tread mold segments 16 for sliding engagement in the pocket type slots.

With reference to FIGS. 3–6, the assembly of a segmented tire mold 10 according to the invention is illustrated. With reference to FIG. 3, the tread mold segments 16 are assembled into slide blocks and arranged on a table 80. The table 80 has a lubricated surface so that the segments 16 may be easily arranged in their appropriate positions. The retainer tee members 62 are inserted into the pocket type slots 58. The O-ring 36 is inserted into the circumferential groove 48 in the upper sidewall mold plate 52. The upper sidewall mold plate 52 is suspended in a raised position while the tread mold segments 16 and retainer tee members 62 are slid in place.

Figure 4:
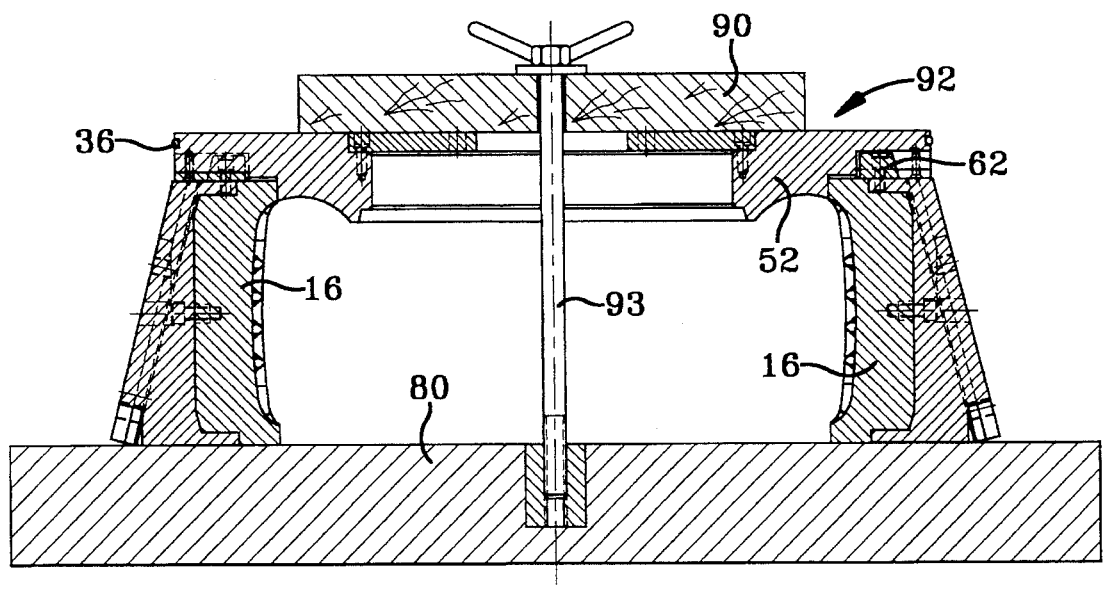

With reference to FIG. 4, when all the tread mold segments 16 are in proper position in a tread segment and upper sidewall mold plate assembly 92, the upper sidewall mold plate 52 is clamped on the table 80 with a wooden clamp bar 90 by a clamping rod 93. In some applications clamping in not necessary where the weight of the parts is sufficient to keep them in place.

Figure 5:
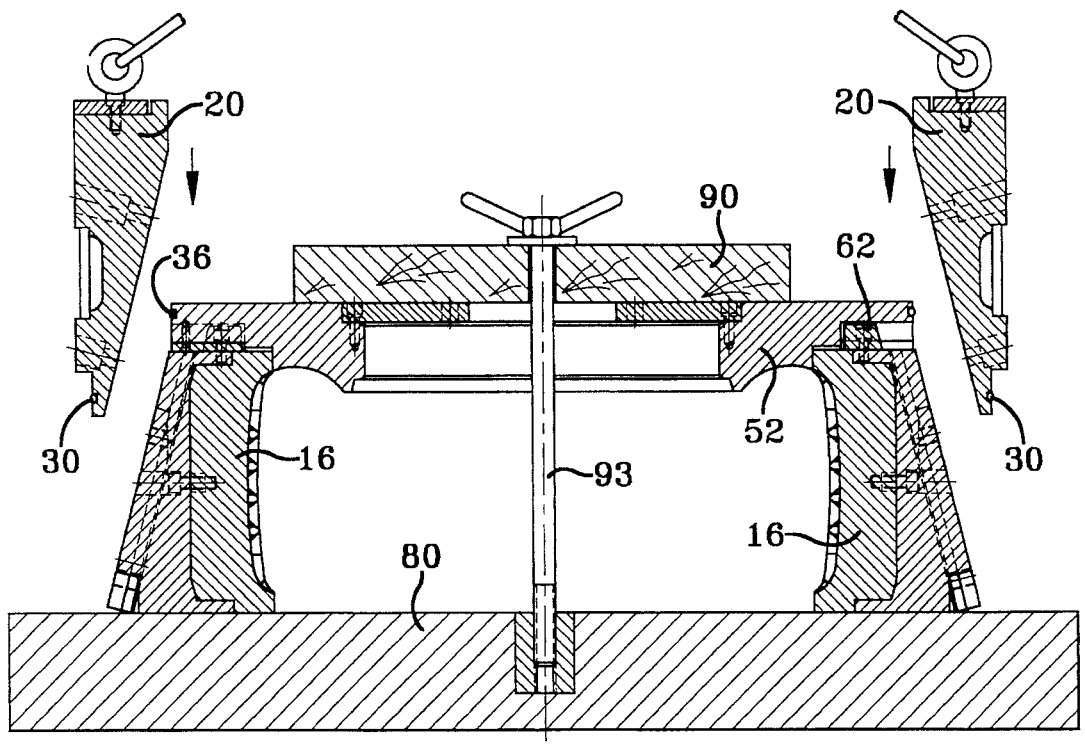
Figure 6:
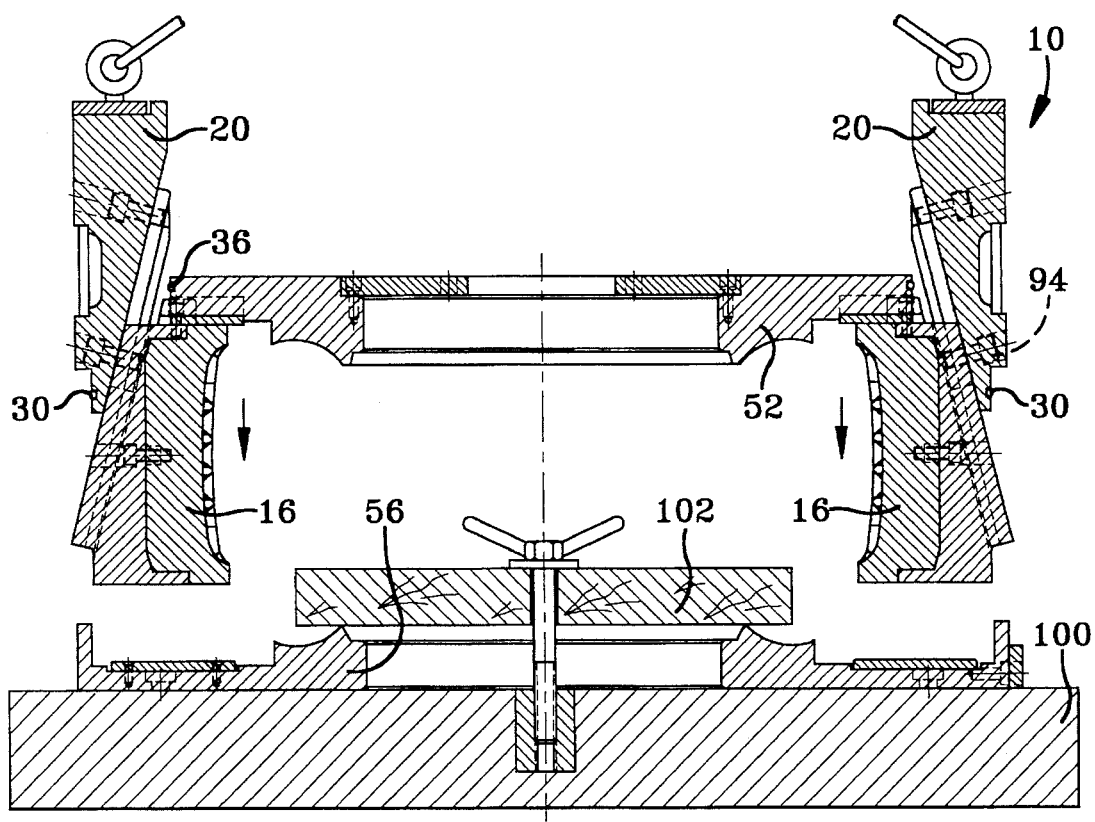

With reference to FIG. 5, the actuating ring 20 is fitted with O-ring 30 and lowered over the assembly 92. Stop bolts 94 shown in FIG. 6 are installed. Next, the wooden clamp 90 on the upper sidewall mold plate 52 is removed by removing the clamping rod 93.

With reference to FIG. 6, the assembly 92 and actuating ring 20 are now positioned over the lower sidewall mold plate 56 which has been previously secured to a separate table 100 and clamped with wooden clamp 102. The suspended assembly 92 and actuating ring 20 are lowered onto the lower sidewall mold plate 56 in position and arranged so that the mold 10 is fully closed. At this time, shipping straps are installed and the mold is ready to be moved and installed in a tire curing press.

The procedure for mounting the mold 10 into a press is as follows. The mold 10 is set in position in a press. Two temporary hold-down clamps are installed in the platen slots 180° from each other. The mold is bolted to the top of the press. After the mold is opened, a sealant or seal such as a gasket is applied to the shoulders of the bolts for sealing. Next the bolts are installed through the bottom sidewall plate into the press platen. The temporary clamps 94 and 102 are removed.

The above procedure enables the mold 10 to be installed into a tire press with O-rings 30, 36 in place. Preferably, the O-rings 30, 36 should be lubricated with an appropriate lubricant, such as that sold under the trademark Parker High-Temp. The O-rings 30, 36 should be lubricated when they are installed and when the mold is cleaned. At every cleaning cycle, the O-rings 30, 36 should be inspected for excessive wear or fraying and should be replaced when worn or damaged.

Figure 7:
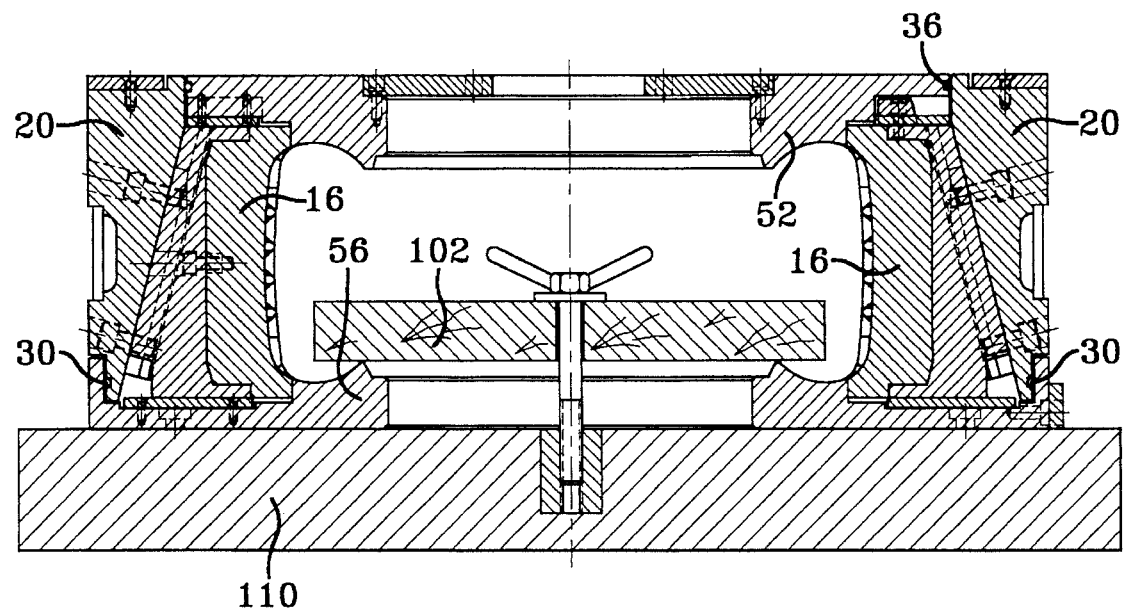
FIGS. 7–11 are cross-sectional views of a method of dissembling a tire mold according to the invention.

With reference to FIGS. 7–11, the disassembly of the mold 10 will be illustrated. With reference to FIG. 7, the mold 10 has been removed from the press and set on a table 110. The shipping straps (not shown) have been removed. The lower sidewall mold plate bar 56 is clamped to the table 110 with wooden clamp bar 102.

Figure 8:
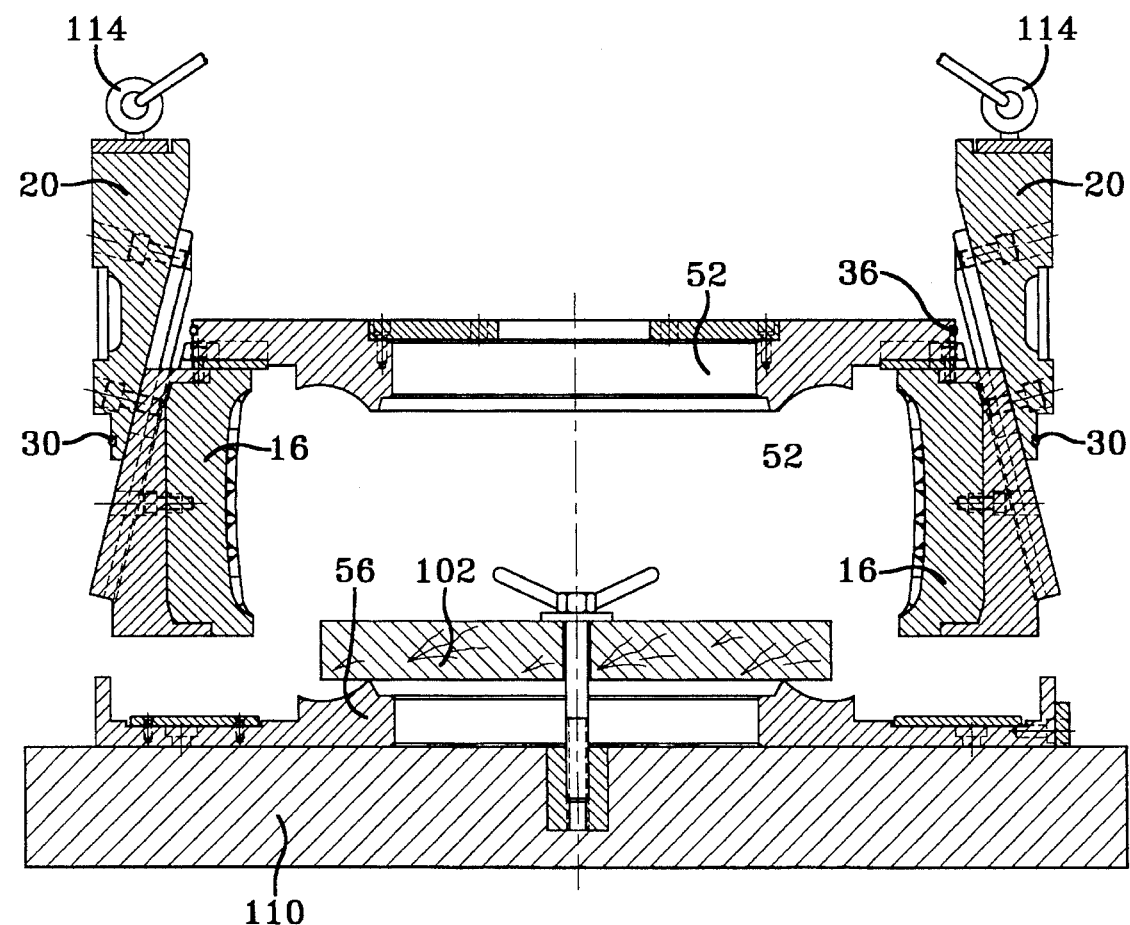
Figure 9:
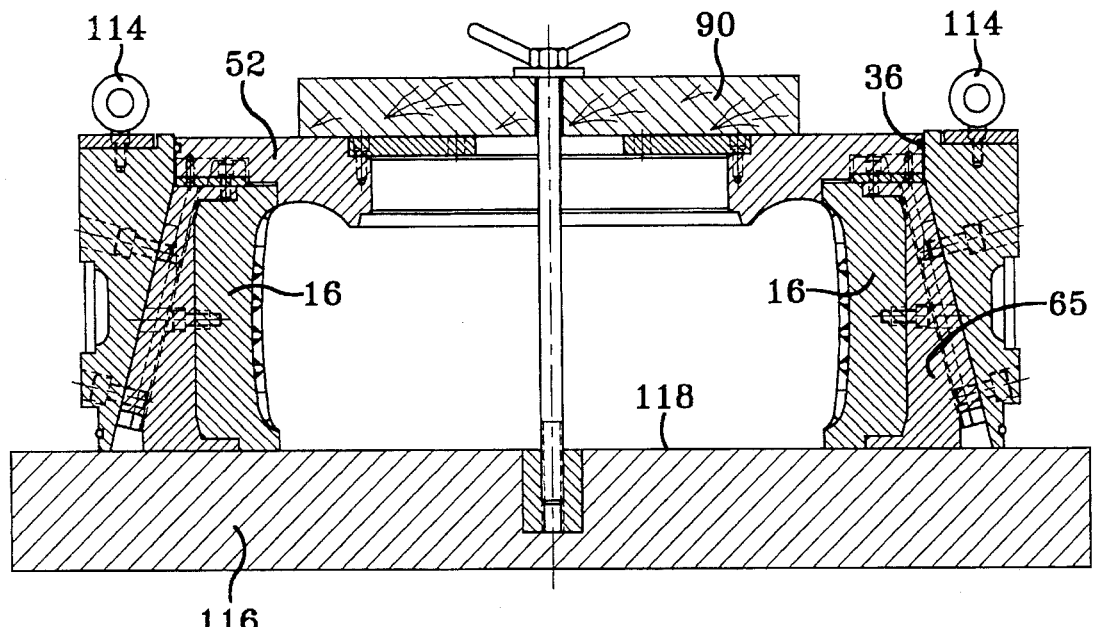
Figure 10:
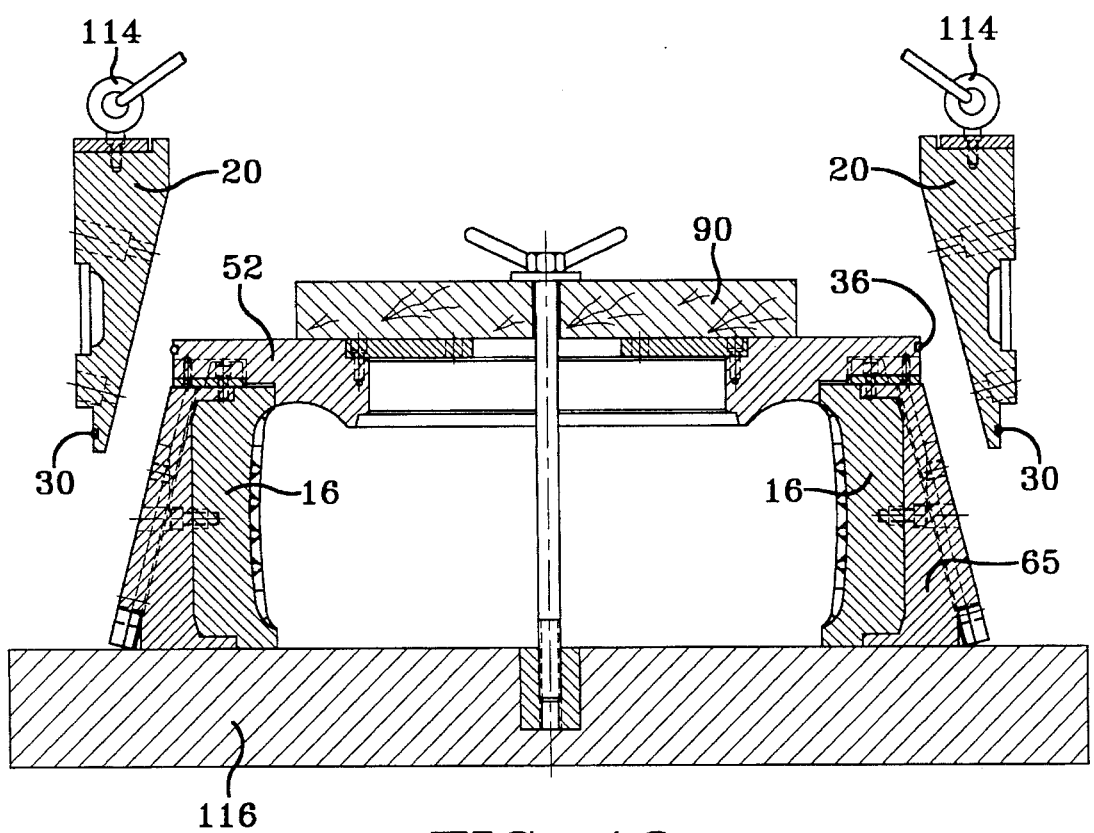

With reference to FIGS. 8 and 9, eye bolts 114 are installed in the actuating ring 20 to lift the balance of the assembly and place it on a second table 116 with a lubricated surface 118. Next, the upper sidewall mold plate 52 is clamped to the table 16 with wooden clamp bar 90. The stop bolts 94 (not shown) are removed. With reference to FIG. 10, the actuating ring 20 is lifted via eye bolts 114 and set on another table (not shown) for lubrication.

Figure 11:
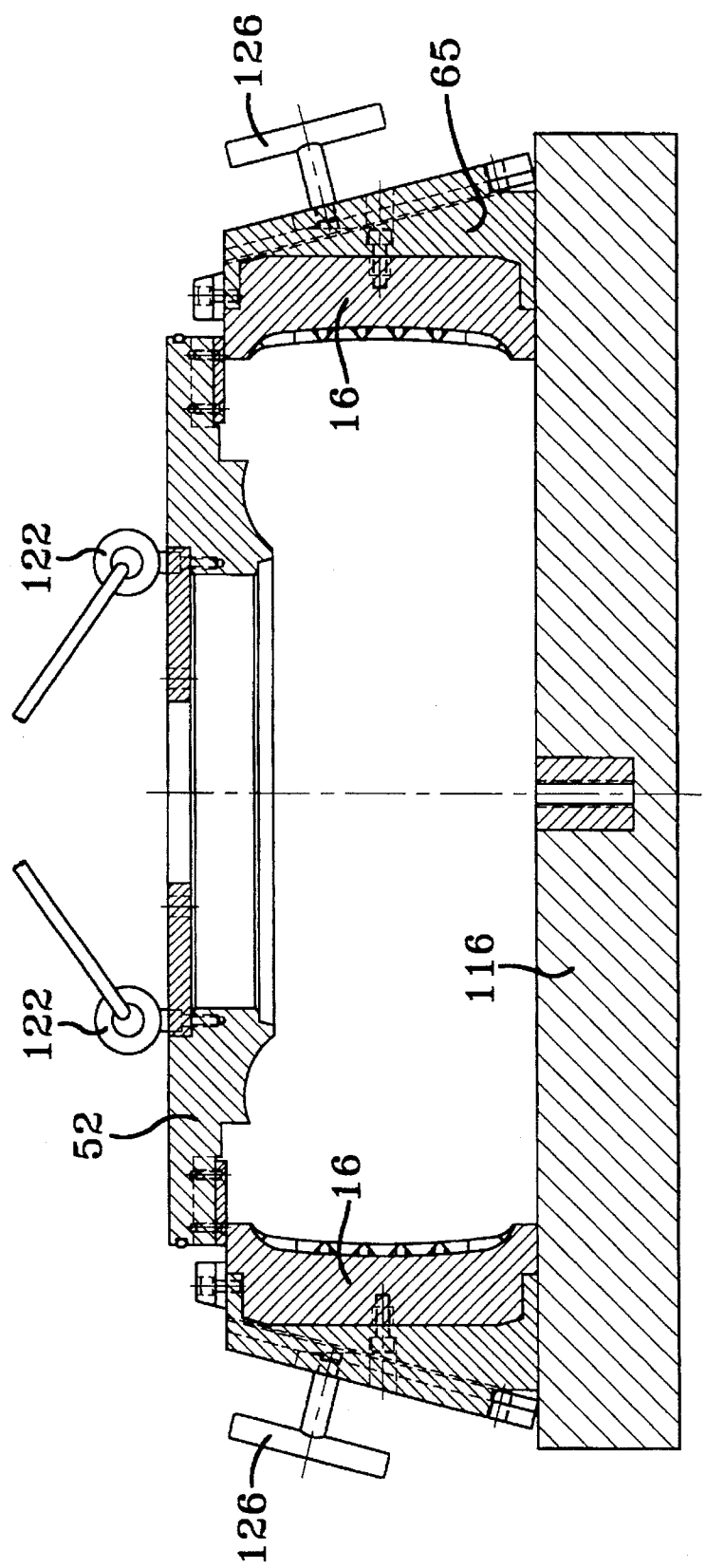

With reference to FIGS. 10 and 11, the wooden clamp bar 90 is now removed from the upper sidewall mold plate 52. Eye bolts 122 are installed in the upper sidewall mold plate 52. The upper sidewall mold plate 52 is suspended to release its weight off of the slide blocks. Where necessary for disassembly tee handles 126 are screwed into retraction tee holes in the slide blocks 65 and are used to pull the side blocks radially outwardly so that the retainer tee members 62 clear the pocket type slots 58 in the upper sidewall mold plate 52. The mold 10 is now ready for cleaning or lubricating.

With reference to FIG. 1, significant differences between the tire mold 10 according to the invention shown in FIG. 1 and a standard tire mold will be illustrated. First, while a standard tire mold has vent holes, the tire mold 10 of FIG. 1 has no vent holes. Another important difference is the one piece upper and lower sidewall mold plates 52, 56 of the mold 10 shown in FIG. 1.

Another differences is that conventional tire molds are of multiple pieces, including not only upper and lower sidewall mold plates 52, 56 but also other multiple pieces which are bolted or otherwise connected together. Because the conventional mechanisms have a plurality of components, each of the interfaces between the components must be sealed in order to draw a proper vacuum. The integral, one-piece design of the upper and lower sidewall mold plates 52, 56 of the inventive mold 10, as illustrated in FIG. 1, eliminates the need for many seals. Another difference is the pocket type slots 58 as utilized in FIG. 1. With a pocket type slot 58, the mold is closed at the top and the O-ring 36 provides sealing. In a conventional mold open slots at the outside diameter receive retainer tee members 62.

With continuing reference to FIG. 1, another important difference in the bottom sidewall mold plate 56 is the provision of a circular flange 72 at the outside diameter of the bottom sidewall mold ring 56, as well as O-ring 30. A conventional mold does not have these features. The actuating ring 20 in the inventive mold 10 includes a bronzed radially inner cylindrical surface 38 and a bronzed radially outer cylindrical surface 32 to minimize wear and to provide a closer fit with the mating surfaces. A standard mold does not have this features.

Despite these many differences, an important attribute of the inventive mold 10 shown in FIG. 1 is that it accepts the same size tires as a standard mold, fits the same presses, and provides a superior tire product with no appreciable additional difficulty.

Figure 12:
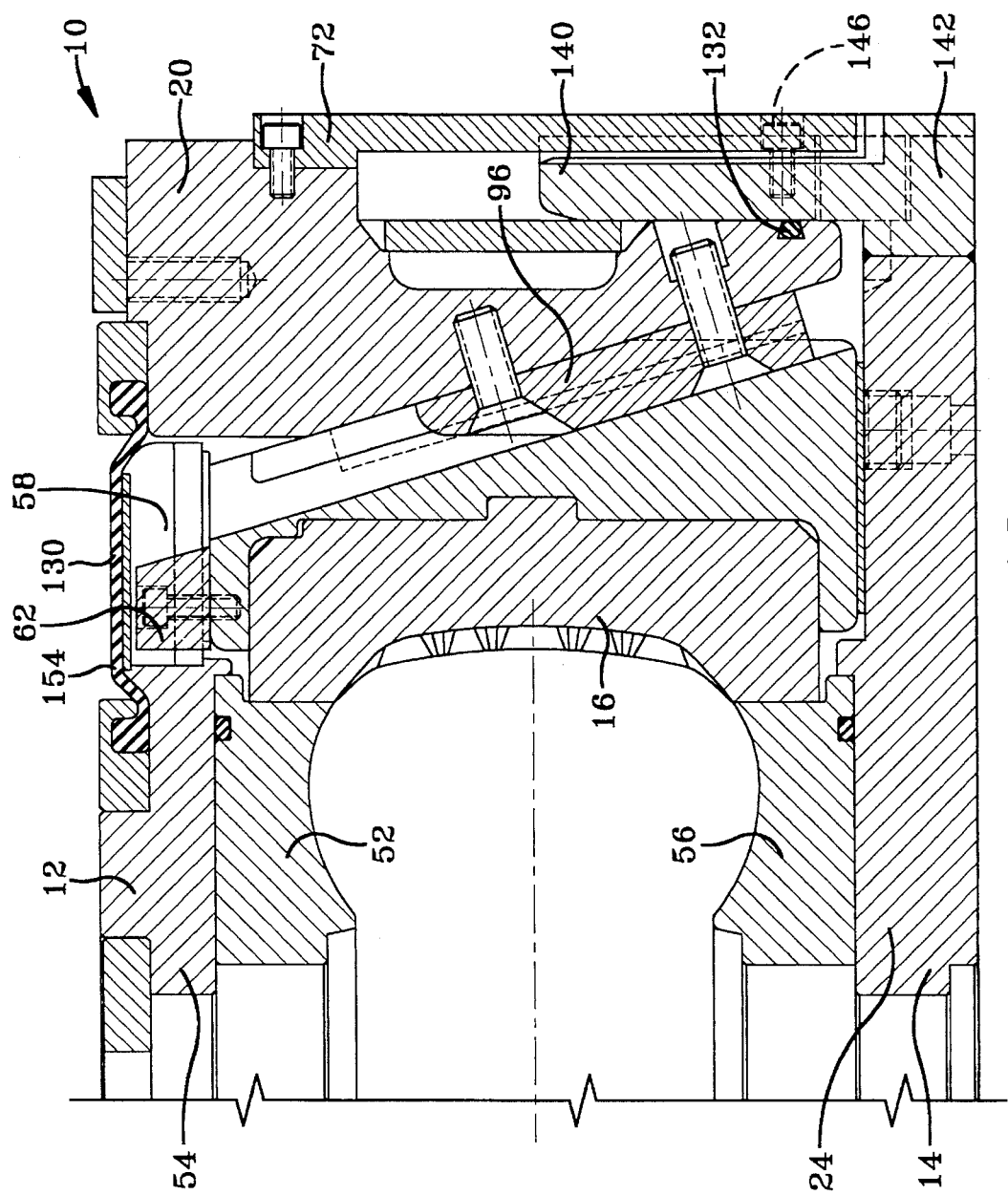
FIG. 12 is a cross-sectional view of one half of a tire mold according to an alternate embodiment of the invention.

With reference to FIG. 12, another embodiment of the invention is illustrated. Many of the elements of the embodiment shown in FIG. 12 are similar or the same as elements shown of the embodiment shown in FIG. 1. The tire mold 10 includes an upper sidewall mold assembly 12, a lower sidewall mold assembly 14 and tread mold segments 16. In this embodiment, the upper and lower sidewall mold assemblies 12, 14 are not a single piece, as in the embodiment shown in FIG. 1, but instead are comprised of several pieces. The upper sidewall mold plate 52 abuts and cooperates with upper mold support member 54 while lower sidewall mold plate 56 abuts and cooperates with lower mold support member 24. An actuating ring 20 produces radial movement of the tread mold segments 16 as illustrated previously. The actuating ring 20 is connected to the tread mold segments 16 via retraction tee bolts 96. Retainer tee members 62 slide within pocket type slots 58.

The primary differences between this embodiment and that shown in FIG. 1 concerns the sealing means. An upper sealing means 130 and a lower sealing means 132. The lower sealing means 132 includes a spring sealing ring 136 mounted on the actuating ring 20. The sealing ring 136 slides against a cylindrical shell 140 fixed on a bottom container plate 142. Four flat pins 146 are used to precenter the actuating ring 20. The flat pins 146 are spaced 90° part about the circumference of the mold 10 and are located in such a way as to best use the available space within the press (not shown). For example, the available space within the tire press is square-shaped while the mold 10 is round; therefore, the pins 146 are placed in the corners of the square-shaped press space. The advantage of this arrangement is that the diameters of the actuating ring 20 and the cylindrical shell 140 don't need to be precise. The upper sealing means 130 is a sealing bladder 154. Its operation will be discussed in more detail following.

Figure 13:
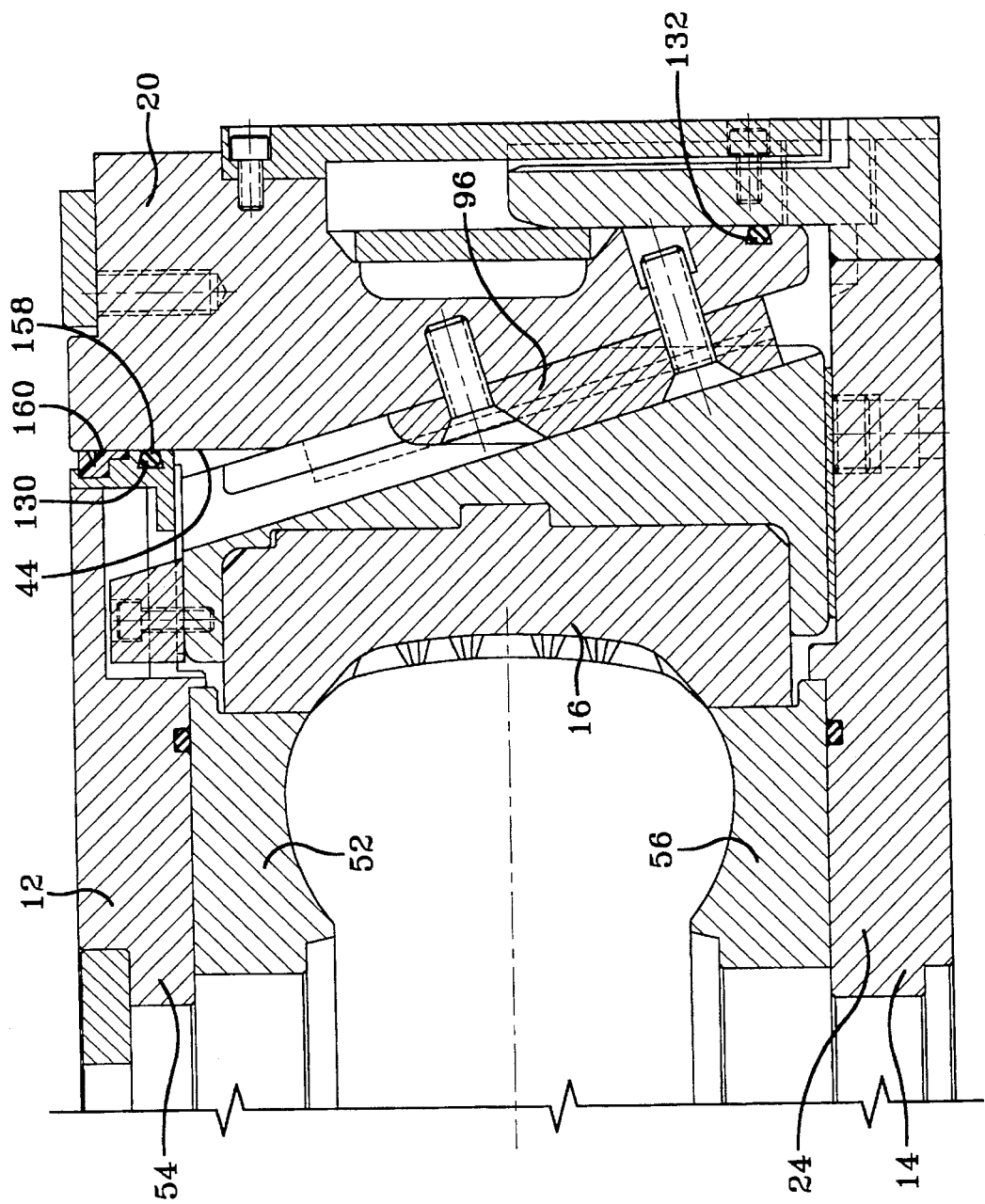
FIG. 13 is a cross-sectional view of one half of a tire mold according to another embodiment of the invention.

With reference to FIG. 13, an alternate design upper sealing means 130 includes a spring ring 158 which slides against the radially inner surface 44 of the actuating ring 20. The precentering of the upper mold member 52 is accomplished by a precentering ring 160 which is made of PTFE material or an equivalent.

In the embodiment shown in FIG. 13, the retainer tee members 62 shown in FIG. 1 is replaced by a link system between the slide blocks and the top mold container plate 52. This link system is known in the art and is disclosed in U.S. Pat. No. 3,779,677 of Greenwood.

Figure 14:
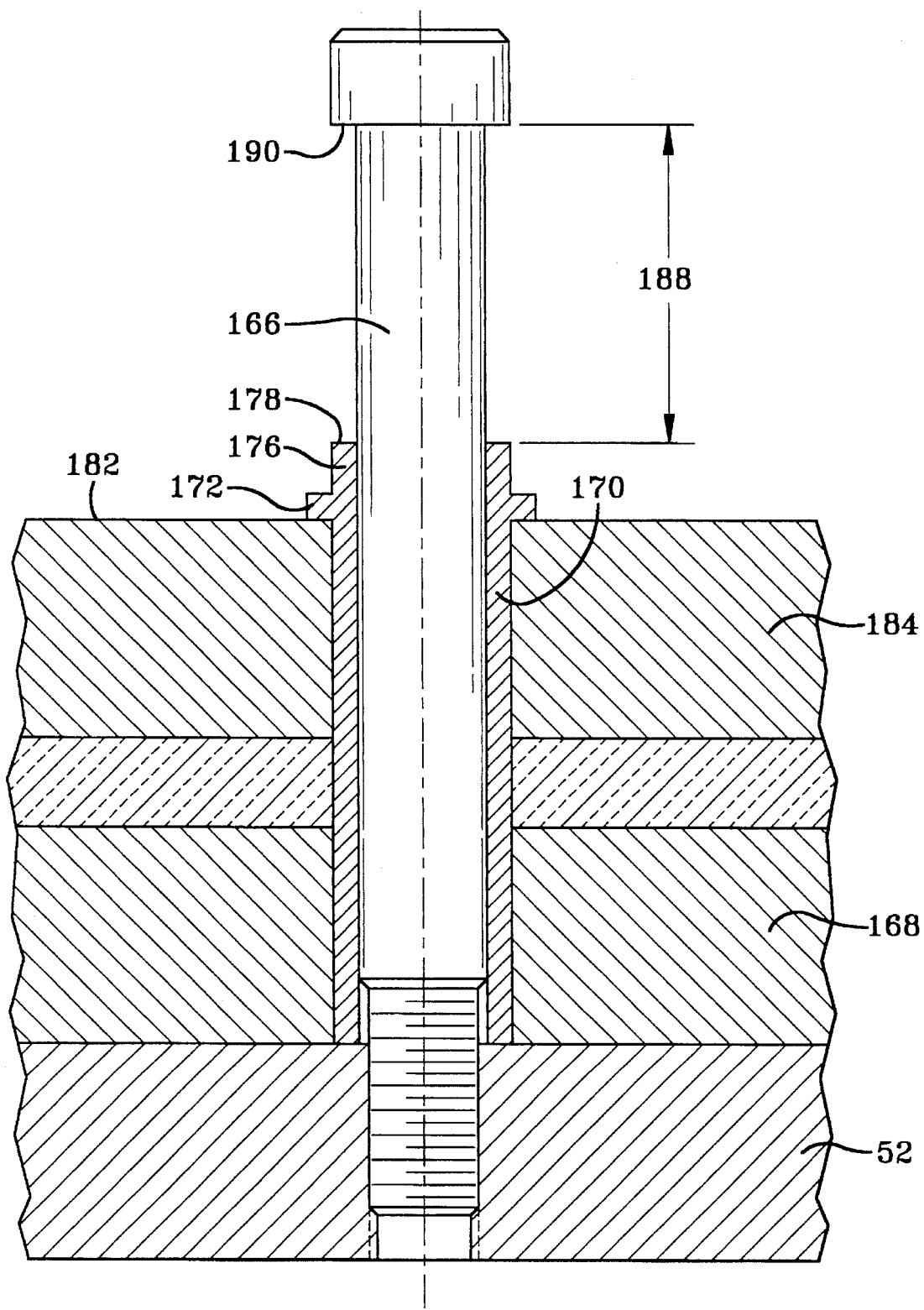
FIG. 14 is a cross-sectional schematic view of a support rod for a tire mold made according to one embodiment of the invention.

With reference to FIG. 14, another feature of the embodiment shown in FIG. 13 is described. In FIG. 14, a mechanism to provide improved centering of the upper sidewall mold plate 52 with relation to the actuating ring 20 and lower mold support member 24 is illustrated. A centering rod 166 is mounted on top of an upper press platen 168. A sleeve 170 includes a flange 172 and an extension 176. Depending on the distance the top surface 178 of the extension extends above the top surface 182 of the top press platen support 184, the mold stroke, designated by line 188, is adjustable. When the press is fully closed, the bottom surface 190 of cap 192 abuts the top surface 178 of the extension 176.

The device shown in FIG. 14 may not be necessary for operation of the tire mold 10 but can be used to limit the segment retraction and so replace the stop bolts used in other designs.

Figure 15:
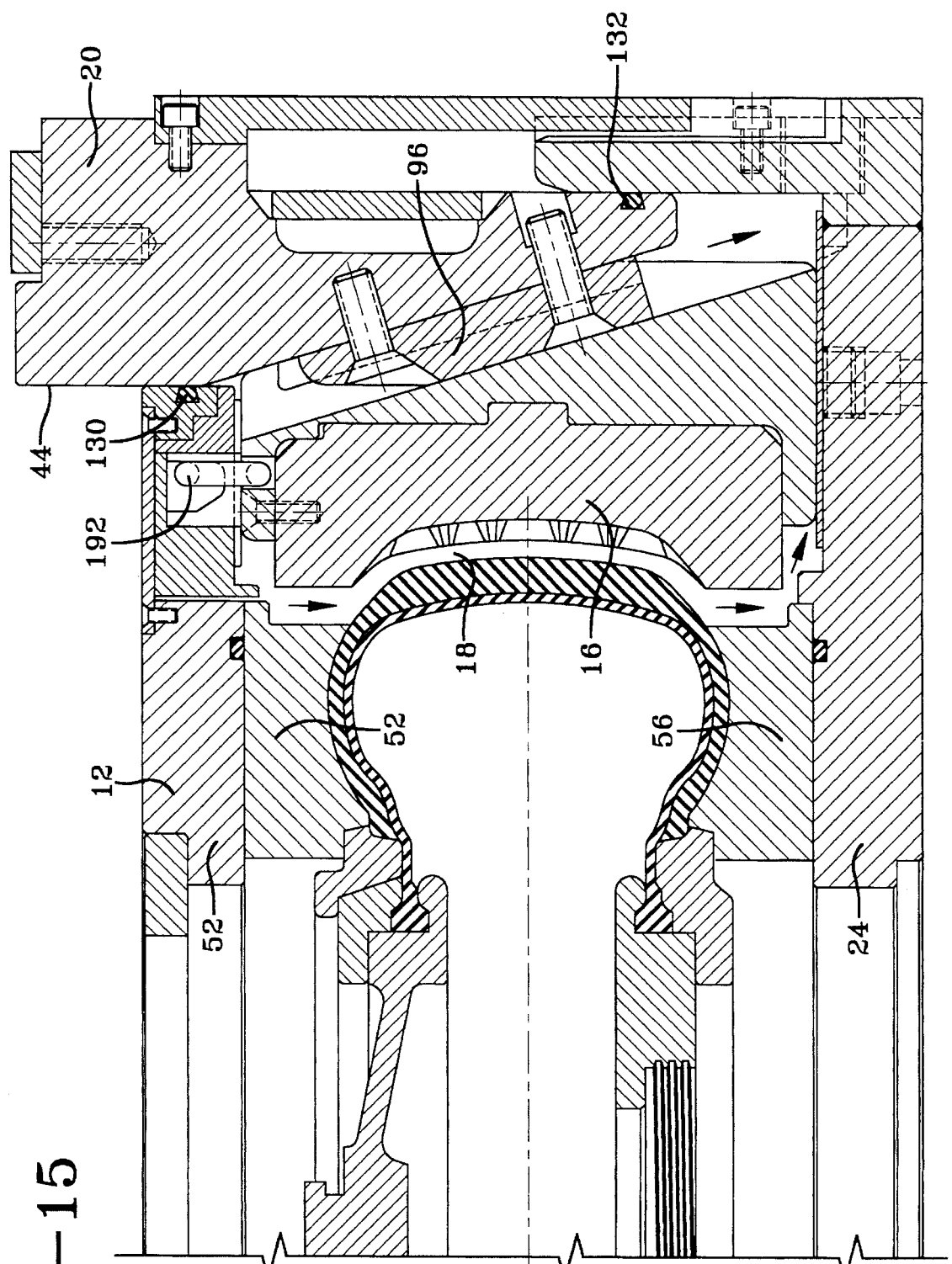
FIG. 15 is a cross-sectional view of one half of a tire mold made according to another embodiment of the invention.
Figure 16:
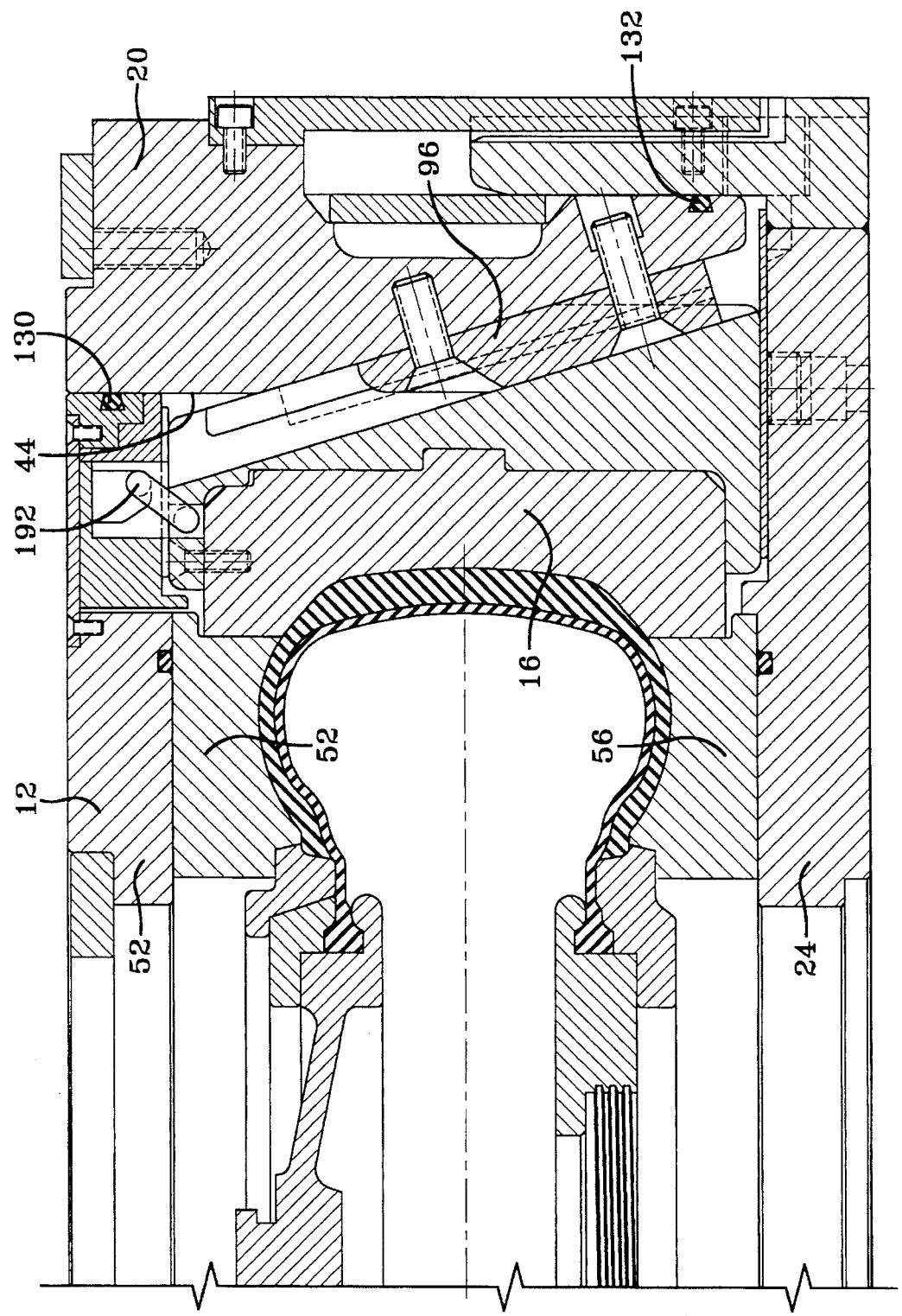
FIG. 16 is a cross-sectional view of one half of a tire mold shown in FIG. 15 when the mold is closed.

With reference to FIGS. 15–16, the timing of the application of vacuum according to one embodiment of the invention will be illustrated. With reference to FIG. 15, the mold is air-tight so that the vacuum may be communicated to the mold cavity 18. The arrows indicate the flow of air being evacuated from the mold cavity 18 by the vacuum. The sequence of operations is as follows. The lower sidewall mold support member 24 is mounted on the press board (not shown) and is stationary. The upper sidewall mold plate 52 is fastened to the top beam (not shown) of the tire press (not shown) and carries the upper sidewall mold plate 52 and the tread mold segments 16.

As the press begins to close, the upper sidewall mold plate 52 lowers the actuating ring 20, causing the tread segments 16 to swing on links 192 and move radially inward. Therefore, the sequence of press closing begins with the top press beam being lowered. Next the actuating ring 20 is lowered. Then the upper sidewall mold plate 52 and tread mold segment 16 are lowered. This procedure must be done in such a way as to maintain a vacuum by maintaining a seal. With reference to FIG. 16, the mold is shown in the closed position with the vacuum already drawn.

Figure 17:
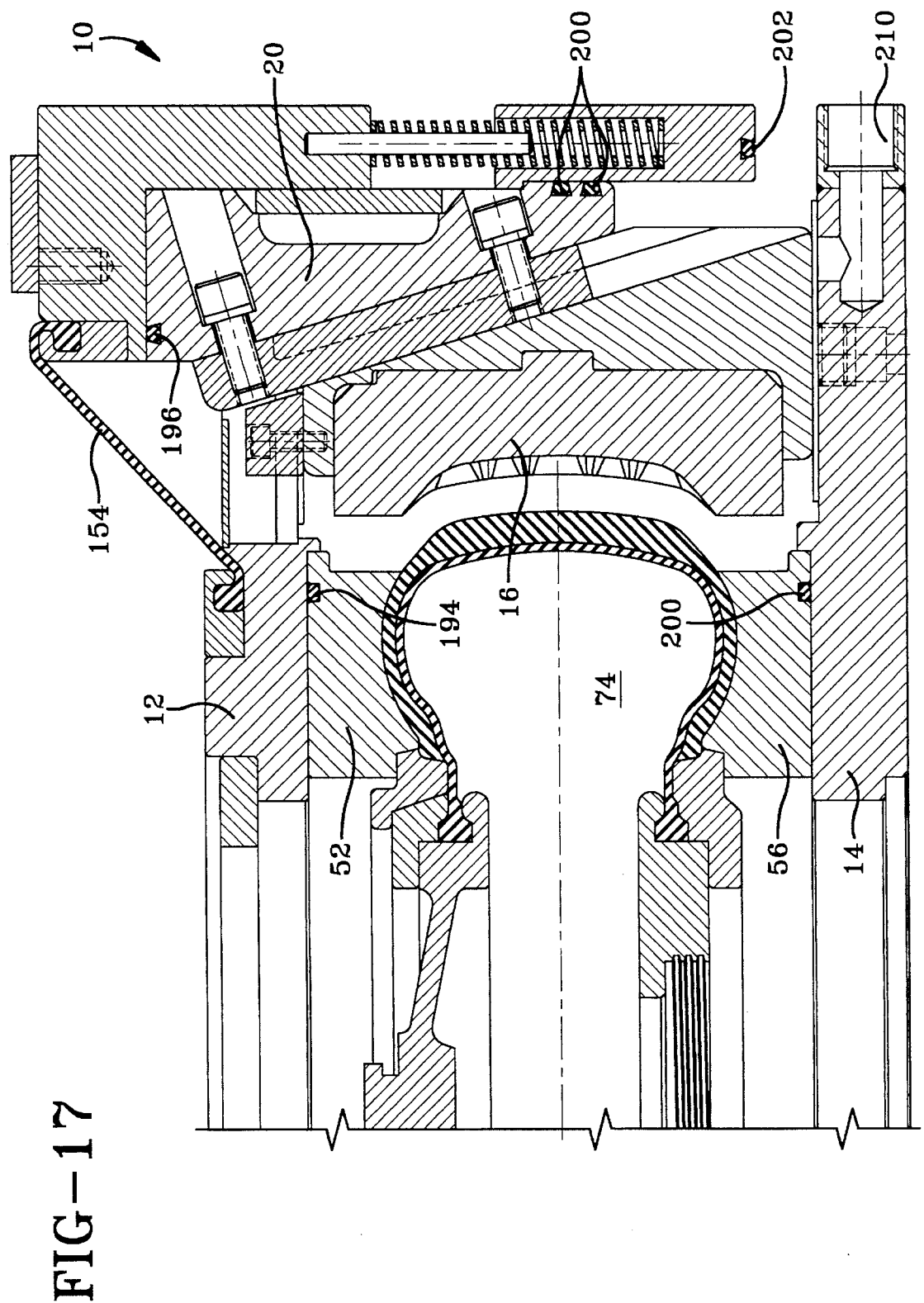
FIG. 17 is a cross-sectional view of one half of a tire mold according to the invention shown with mold beginning to close.
Figure 18:
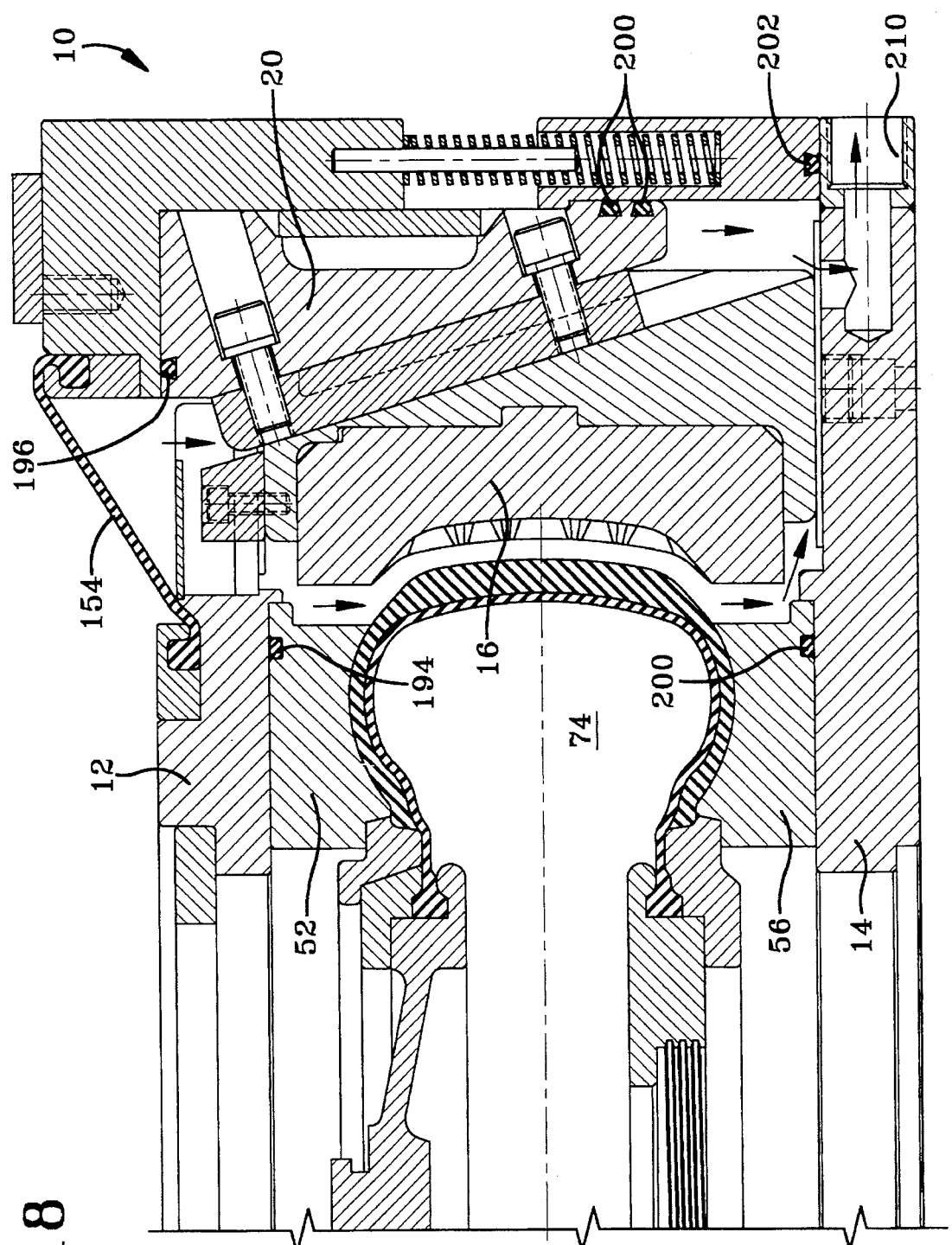
FIG. 18 is a cross-sectional view of the embodiment of the invention shown in FIG. 16, but shown with the mold air tight and vacuum activated.
Figure 19:
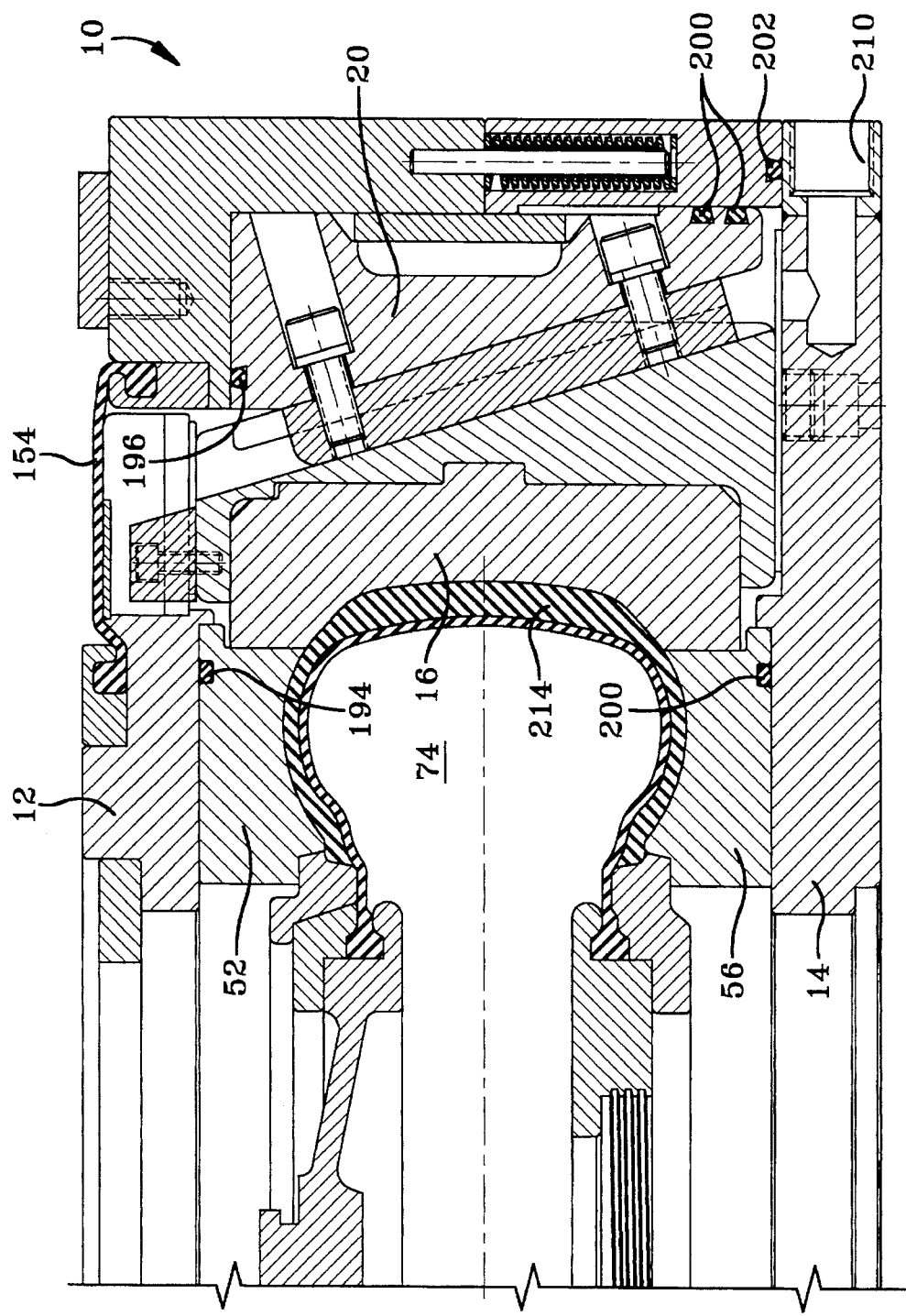
FIG. 19 is a cross-sectional view of one half of a tire mold as shown in FIGS. 16 and 17, but shown with the mold closed and the vacuum shut off.

With reference to FIGS. 17–19, another embodiment of the invention is shown. As before, many of the components are similar to the components of the other embodiments shown in the other Figures. The tire mold 10 includes an upper sidewall mold plate 52, a lower sidewall mold plate 56, tread mold segments 16 and actuating ring 20. With reference to FIG. 17, the upper sealing means 130 is a sealing bladder 154. The sealing means further includes O-rings 194, 196. The lower sealing means includes O-rings 200 and 202. In FIG. 17, when the actuating ring 20 moves radially upward, the tread mold segments 16 move radially outward. The seal is maintained by the bladder 154 stretching and reorienting.

With reference to FIG. 18, the next step in the sequence is illustrated, wherein the actuating ring 20 moves downward, causing the tread mold segment 16 to move radially inward, and lessening the stretch on bladder 154. Vacuum is communicated by passageway 210 and the mold 10 is evacuated.

With reference to FIG. 19, the mold 10 is shown in a closed position and the vacuum is shut off while the tire 214 is vulcanized.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for providing a vacuum in a segmented tire mold having an upper sidewall assembly and a lower sidewall assembly, a plurality of radially moveable tread mold segments operable with said upper sidewall assembly and said lower sidewall assembly to define a tire mold cavity in the closed position of said tire mold, a conical actuating ring assembly surrounding said mold segments and slidably engagable with said mold segments to provide radial movement of said mold segments into engagement with said upper sidewall assembly and said lower sidewall assembly, said apparatus comprising;

(a) a first sealing means between said actuating ring assembly and said lower sidewall assembly;

(b) a second sealing means between said actuating ring assembly and said upper sidewall assembly;

(c) said first sealing means and said second sealing means being operative to seal a space defined by said actuating ring assembly, said upper sidewall assembly, said lower sidewall assembly and an associated tire in said tire mold cavity, said space being sealed while said tread mold segments are spaced from said associated tire; and, (d) means for communicating said vacuum to said space for removing gases from said tire mold cavity upon closing of said mold.

2. Apparatus in accordance with claim 1 wherein said upper sidewall assembly has a radially outer cylindrical surface, said actuating ring assembly has a radially inner cylindrical surface in alignment with said outer cylindrical surface of said upper sidewall assembly and said second sealing means is disposed between said outer cylindrical surface of said upper sidewall assembly and said inner cylindrical surface of said actuating ring assembly.

3. Apparatus in accordance with claim 2 wherein said second sealing means includes a sealing member disposed in a circumferential groove in said outer cylindrical surface of said upper sidewall assembly for sealing engagement with said inner cylindrical surface of said actuating member during closing of said mold.

4. Apparatus in accordance with claim 2 wherein said tread mold segments are connected to said upper sidewall assembly by support means permitting radial movement of said segments in response to vertical movement of said actuating ring assembly relative to said segments and said support means being covered to maintain the integrity of said space for application of vacuum.

5. Apparatus in accordance with claim 4 wherein said support means comprises pocket type slots closed at the top in said upper sidewall assembly and retainer tee members on said segments for sliding engagement in said slots.

6. Apparatus in accordance with claim 4 wherein said support means comprises pocket type slots open at the top in said upper sidewall assembly, retainer tee members on said segments for sliding engagement in said slots and cover members fastened to said upper mold member over said slots.

7. Apparatus in accordance with claim 5 wherein said pocket type slots include supporting plate members fastened to a lower face of said upper sidewall assembly under said slots.

8. Apparatus in accordance with claim 7 wherein said supporting plate members are fastened to said upper plate member by screws.

9. Apparatus in accordance with claim 1 wherein said second sealing means comprises a bladder ring having a radially inner edge fastened to said upper sidewall assembly and a radially outer edge fastened to said actuating ring assembly.

10. Apparatus in accordance with claim 9 wherein said bladder ring is disposed under a circular shield fastened to said upper mold assembly to protect said bladder ring.

11. Apparatus in accordance with claim 1 wherein said upper sidewall assembly comprises an integral upper sidewall mold member and said second sealing means includes an O-ring on said upper sidewall mold member.

12. An improved process for providing a vacuum for an uncured tire in a segmented tire mold having an upper sidewall assembly, a plurality of radially moveable tread mold segments cooperable with said upper sidewall assembly and a lower sidewall assembly to define a tire mold cavity, a conical actuating ring assembly surrounding and slidably engagable with said mold segments to provide radial movement of said segments into engagement with said upper sidewall assembly and said lower sidewall assembly comprising:

(a) positioning said uncured tire between said upper sidewall assembly and said lower sidewall assembly;

(b) moving said actuating ring assembly downwardly to urge said segments radially inwardly into engagement with said upper sidewall assembly and said lower sidewall assembly;

(c) providing a seal between said upper sidewall assembly and said actuating ring assembly;

(d) providing a seal between said lower sidewall assembly and said actuating ring assembly;

(e) communicating a vacuum to a tire mold cavity defined by said lower sidewall assembly, said upper sidewall assembly and said segments;

(f) closing said tire mold while communicating said vacuum to said tire mold cavity;

(g) applying heat and pressure to said uncured tire for vulcanization thereof; and, (h) opening said tire mold for removal of said tire from said mold.

* * * * *

(12) EX PARTE REEXAMINATION CERTIFICATE (5079th)
United States Patent
Moris-Herbeuval et al.

(10) Number: US 5,585,064 C1
(45) Certificate Issued: Mar. 8, 2005

(54) VENTLESS SEGMENTED TIRE MOLD AND METHOD THEREFORE

(75) Inventors: Véronique Moris-Herbeuval, Arlon (BE); Raymond Merx, Junglingster (LU); Klaus Schmitt, Biesdorf (DE); Helmut Dernbach, Cuyahoga Falls, OH (US); Craig D. Miller, Norton, OH (US); Bernard B. Jacobs, Akron, OH (US)

(73) Assignee: Goodyear Tire & Rubber Company, Akron, OH (US)

Reexamination Request:
No. 90/006,486, Dec. 17, 2002

Reexamination Certificate for:
Patent No.: 5,585,064
Issued: Dec. 17, 1996
Appl. No.: 08/277,217
Filed: Jul. 20, 1994

(51) Int. Cl.[7] .............................................. B29C 35/00
(52) U.S. Cl. ....................... 264/501; 264/102; 264/326; 425/47

(56) References Cited

U.S. PATENT DOCUMENTS

| 3,972,978 | A | * | 8/1976 | Caretta ......................... 425/38 |
| 4,573,894 | A |   | 3/1986 | Blayne et al. ................. 425/36 |
| 5,145,688 | A |   | 9/1992 | Ohtake ......................... 425/28.1 |

FOREIGN PATENT DOCUMENTS

| EP | 0451832 A2 | 3/1996 |
| JP | 4-197713 | 7/1992 |

OTHER PUBLICATIONS

"O–ring Gland Design Guidelines", Dichtomatik, O–ring Handbook, 2002, pp. 12–22.*
Minnesota Rubber and QMR Plastics Quadion Corporation, Rubber and Thermoplastic Products Internet Design Guide, 2002.*

* cited by examiner

Primary Examiner—Jill L. Heitbrink

(57) ABSTRACT

An apparatus for providing a vacuum in a segmented tire mold includes an upper sidewall assembly an lower sidewall assembly, a plurality of radially moveable tread mold segments operable with the upper sidewall assembly and lower sidewall assembly to define a tire mold cavity. A conical actuating ring assembly surrounds the tire mold segments and engages the mold segments to provide radial movement of the mold segments. The apparatus includes a first seal between the conical actuating ring assembly and the lower mold assembly, as well as a second seal between the conical actuating ring and the upper sidewall assembly, thereby sealing the space defined by the tire mold so that a vacuum can be drawn on the tire mold cavity upon the closing of the mold.

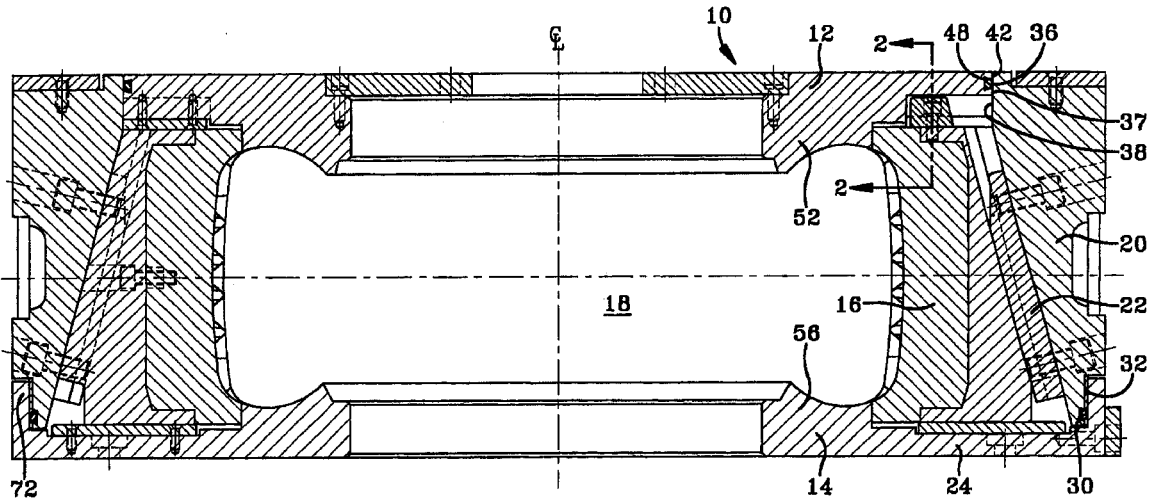

US 5,585,064 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 9, 10 and 12 are cancelled.

Claims 4, 6, 8 and 11 are determined to be patentable as amended.

Claims 5 and 7, dependent on an amended claim, are determined to be patentable.

New claims 13–34 are added and determined to be patentable.

4. Apparatus in accordance with claim [2] *13* wherein said tread mold segments are connected to said upper sidewall assembly by support means permitting radial movement of said segments in response to vertical movement of said actuating ring assembly relative to said segments and said support means being covered to maintain the integrity of said space for application of vacuum.

6. Apparatus in accordance with claim 4 wherein said support means comprises pocket type slots open at the top in said upper sidewall assembly, retainer tee members on said segments for sliding engagement in said slots and cover members fastened to said upper [mold member] *sidewall assembly* over said slots.

8. Apparatus in accordance with claim 7 wherein said supporting plate members are fastened to said upper [plate member] *sidewall assembly* by screws.

11. Apparatus in accordance with claim [1] *13* wherein said upper sidewall assembly comprises an integral upper sidewall mold member and said second sealing means includes an O-ring on said upper sidewall mold member.

*13. Apparatus for providing a vacuum in a segmented tire mold having an upper sidewall assembly and a lower sidewall assembly, a plurality of radially moveable tread mold segments operable with said upper sidewall assembly and said lower sidewall assembly to define a tire mold cavity in the closed position of said tire mold, a conical actuating ring assembly surrounding said mold segments and slidably engagable with said mold segments to provide radial movement of said mold segments into engagement with said upper sidewall assembly and said lower sidewall assembly, said apparatus comprising:*

*(a) a first sealing means between said actuating ring assembly and said lower sidewall assembly;*

*(b) a second sealing means between said actuating ring assembly and said upper sidewall assembly, wherein said second sealing means comprises a bladder ring having a radially inner edge fastened to said upper sidewall assembly and a radially outer edge fastened to said actuating ring assembly;*

*(c) said first sealing means and said second sealing means being operative to seal a space defined by said actuating ring assembly, said upper sidewall assembly, said lower sidewall assembly and an associated tire in said tire mold cavity, said space being sealed while said tread mold segments are spaced from said associated tire; and,*

*(d) means for communicating said vacuum to said space for removing gases from said tire mold cavity upon closing of said mold.*

*14. Apparatus in accordance with claim 13 wherein said bladder ring is disposed under a circular shield fastened to said upper mold assembly to protect said bladder ring.*

*15. Apparatus in accordance with claim 14 wherein said tread mold segments are connected to said upper sidewall assembly by support means permitting radial movement of said segments in response to vertical movement of said actuating ring assembly relative to said segments and said support means being covered to maintain the integrity of said space for application of vacuum.*

*16. Apparatus in accordance with claim 15 wherein said support means comprises pocket type slots closed at the top in said upper sidewall assembly and retainer tee members on said segments for sliding engagement in said slots.*

*17. An apparatus for providing a vacuum in a ventless segmented tire mold having an upper sidewall assembly and a lower sidewall assembly, a plurality of radially moveable tread mold segments operable with said upper sidewall assembly and said lower sidewall assembly to define a tire mold cavity in the closed position of said tire mold, a conical actuating ring assembly including a conical ring surrounding said mold segments and slidably engagable with said mold segments to provide radial movement of said mold segments into engagement with said upper sidewall assembly and said lower sidewall assembly, said upper sidewall assembly including an upper surface, a lower surface and an upper sidewall mold plate, said apparatus comprising:*

*(a) a first sealing means between said actuating ring assembly and said lower sidewall assembly;*

*(b) a second sealing means between said conical ring of said actuating ring assembly and said upper sidewall mold plate of said upper sidewall assembly;*

*(c) said first sealing means and said second sealing means being operative to seal a space defined by said actuating ring assembly, said lower surface of said upper sidewall assembly, said lower sidewall assembly and an associated tire in said tire mold cavity, said space being sealed while said tread mold segments are spaced from said associated tire; and,*

*(d) means for communicating said vacuum to said space for removing gases from said tire mold cavity upon closing of said mold.*

*18. Apparatus in accordance with claim 17 wherein said conical ring has an inner cylindrical surface and said upper sidewall mold plate has an outer cylindrical surface, said second sealing means comprising:*

*a sealing member disposed in a circumferential groove in said outer cylindrical surface of said upper sidewall mold plate for sealing engagement with said inner cylindrical surface of said conical ring during closing of said mold.*

*19. Apparatus in accordance with claim 18 wherein said tread mold segments are connected to said upper sidewall* assembly by support means permitting radial movement of said segments in response to vertical movement of said actuating ring assembly relative to said segments and said support means being covered to maintain the integrity of said space for application of vacuum.

20. Apparatus in accordance with claim 19 wherein said support means comprises pocket type slots closed at the top in said upper sidewall assembly and retainer tee members on said segments for sliding engagement in said slots.

21. Apparatus in accordance with claim 19 wherein said support means comprises pocket type slots open at the top in said upper sidewall assembly, retainer tee members on said segments for sliding engagement in said slots and cover members fastened to said upper sidewall assembly over said slots.

22. Apparatus in accordance with claim 20 wherein said pocket type slots include supporting plate members fastened to a lower face of said upper sidewall assembly under said slots.

23. Apparatus for providing a vacuum in a ventless segmented tire mold having an upper sidewall assembly including an upper sidewall mold plate and an abutting upper mold support member and a lower sidewall assembly, a plurality of radially moveable tread mold segments operable with said upper sidewall assembly and said lower sidewall assembly to define a tire mold cavity in the closed position of said tire mold, a conical actuating ring assembly including a conical ring surrounding said mold segments and slidably engagable with said mold segments to provide radial movement of said mold segments into engagement with said upper sidewall assembly and said lower sidewall assembly, said apparatus comprising:
  (a) a first sealing means between said actuating ring assembly and said lower sidewall assembly;
  (b) a second sealing means between said conical ring of said actuating ring assembly and said upper mold support member of said upper sidewall assembly, wherein said second sealing means comprises a bladder having a first end fastened to said upper mold support member and a second end fastened to said conical ring;
  (c) said first sealing means and said second sealing means being operative to seal a space defined by said actuating ring assembly, said upper sidewall assembly, said lower sidewall assembly and an associated tire in said tire mold cavity, said space being sealed while said tread mold segments are spaced from said associated tire; and,
  (d) means for communicating said vacuum to said space for removing gases from said tire mold cavity upon closing of said mold.

24. Apparatus in accordance with claim 23 wherein said bladder is disposed under a circular shield fastened to said upper mold assembly to protect said bladder.

25. Apparatus in accordance with claim 23 wherein said tread mold segments are connected to said upper sidewall assembly by support means permitting radial movement of said segments in response to vertical movement of said actuating ring assembly relative to said segments and said support means being covered to maintain the integrity of said space for application of vacuum.

26. Apparatus in accordance with claim 25 wherein said support means comprises pocket type slots closed at the top in said upper sidewall assembly and retainer tee members on said segments for sliding engagement in said slots.

27. Apparatus in accordance with claim 25 wherein said support means comprises pocket type slots open at the top in said upper sidewall assembly, retainer tee members on said segments for sliding engagement in said slots and cover members fastened to said upper mold support member over said slots.

28. Apparatus in accordance with claim 26 wherein said pocket type slots include supporting plate members fastened to a lower face of said upper sidewall assembly under said slots.

29. Apparatus for providing a vacuum in a ventless segmented tire mold having an upper sidewall assembly including an upper surface and a lower surface and a lower sidewall assembly, a plurality of radially moveable tread mold segments operable with said upper sidewall assembly and said lower sidewall assembly to define a tire mold cavity in the closed position of said tire mold, a conical actuating ring assembly surrounding said mold segments and slidably engagable with said mold segments to provide radial movement of said mold segments into engagement with said upper sidewall assembly and said lower sidewall assembly, said apparatus comprising:
  (a) a first sealing means between said actuating ring assembly and said lower sidewall assembly;
  (b) a second sealing means between said actuating ring assembly and said upper sidewall assembly;
  (c) said first sealing means and said second sealing means being operative to seal a space defined by said actuating ring assembly, said lower surface of said upper sidewall assembly, said lower sidewall assembly and an associated tire in said tire mold cavity, said space being sealed while said tread mold segments are spaced from said associated tire; and,
  (d) means for communicating said vacuum to said space for removing gases from said tire mold cavity upon closing of said mold.

30. Apparatus in accordance with claim 29 wherein said actuating ring assembly has an inner cylindrical surface and said upper sidewall assembly has an outer cylindrical surface, said second sealing means comprising:
  a sealing member disposed in a circumferential groove in said outer cylindrical surface of said upper sidewall assembly for sealing engagement with said inner cylindrical surface of said actuating ring assembly during closing of said mold.

31. Apparatus in accordance with claim 30 wherein said tread mold segments are connected to said upper sidewall assembly by support means permitting radial movement of said segments in response to vertical movement of said actuating ring assembly relative to said segments and said support means being covered to maintain the integrity of said space for application of vacuum.

32. An improved process for providing a vacuum for an uncured tire in a ventless segmented tire mold having an upper sidewall assembly including an upper surface and a lower surface, a plurality of radially moveable tread mold segments cooperable with said upper sidewall assembly and a lower sidewall assembly to define a tire mold cavity, a conical actuating ring assembly surrounding and slidably engagable with said mold segments to provide radial movement of said segments into engagement with said upper sidewall assembly and said lower sidewall assembly comprising:
  (a) positioning said uncured tire between said upper sidewall assembly and said lower sidewall assembly;
  (b) moving said actuating ring assembly downwardly to urge said segments radially inwardly into engagement with said upper sidewall assembly and said lower sidewall assembly;

(c) providing a seal between said upper sidewall assembly and said actuating ring assembly;

(d) providing a seal between said lower sidewall assembly and said actuating ring assembly;

(e) sealing a space defined by said actuating ring assembly, said lower surface of said upper sidewall assembly, said lower sidewall assembly and said uncured tire in said tire mold cavity;

(f) communicating a vacuum to said space and said tire mold cavity, said tire mold cavity defined by said lower sidewall assembly, said lower surface of said upper sidewall assembly and said segments;

(g) closing said tire mold while communicating said vacuum to said tire mold cavity;

(h) applying heat and pressure to said uncured tire for vulcanization thereof; and, (i) opening said tire mold for removal of said tire from said mold.

33. An improved process for providing a vacuum for an uncured tire in a ventless segmented tire mold having an upper sidewall assembly, a plurality of radially moveable tread mold segments cooperable with said upper sidewall assembly and a lower sidewall assembly to define a tire mold cavity, a conical actuating ring assembly including a conical ring surrounding and slidably engagable with said mold segments to provide radial movement of said segments into engagement with said upper sidewall assembly and said lower sidewall assembly, said upper sidewall assembly including an upper surface, a lower surface and an upper sidewall mold plate, the process comprising:

(a) positioning said uncured tire between said upper sidewall assembly and said lower sidewall assembly;

(b) moving said actuating ring assembly downwardly to urge said segments radially inwardly into engagement with said upper sidewall assembly and said lower sidewall assembly;

(c) providing a seal between said upper sidewall mold plate of said upper sidewall assembly and said conical ring of said actuating ring assembly;

(d) providing a seal between said lower sidewall assembly and said actuating ring assembly;

(e) sealing a space defined by said actuating ring assembly, said lower surface of said upper sidewall assembly, said lower sidewall assembly and an associated tire in said tire mold cavity;

(f) sealing said space while said tread mold segments are spaced from said associated tire; and (g) communicating a vacuum to a tire mold cavity defined by said lower sidewall assembly, said upper sidewall assembly and said segments;

(h) closing said tire mold while communicating said vacuum to said tire mold cavity;

(i) applying heat and pressure to said uncured tire for vulcanization thereof; and, (j) opening said tire mold for removal of said tire from said mold.

34. An improved process for providing a vacuum for an uncured tire in a ventless segmented tire mold having an upper sidewall assembly, a plurality of radially moveable tread mold segments cooperable with said upper sidewall assembly and a lower sidewall assembly to define a tire mold cavity, a conical actuating ring assembly including a conical ring surrounding and slidably engagable with said mold segments to provide radial movement of said segments into engagement with said upper sidewall assembly and said lower sidewall assembly, said upper sidewall assembly including an upper surface, a lower surface, an upper sidewall mold plate and an abutting upper mold support member, the process comprising:

(a) positioning said uncured tire between said upper sidewall assembly and said lower sidewall assembly;

(b) moving said actuating ring assembly downwardly to urge said segments radially inwardly into engagement with said upper sidewall assembly and said lower sidewall assembly;

(c) providing a seal between said upper mold support member of said upper sidewall assembly and said conical ring of said actuating ring assembly;

(d) providing a seal between said lower sidewall assembly and said actuating ring assembly;

(e) sealing a space defined by said actuating ring assembly, said lower surface of said upper sidewall assembly, said lower sidewall assembly and an associated tire in said tire mold cavity;

(f) sealing said space while said tread mold segments are spaced from said associated tire; and (g) communicating a vacuum to a tire mold cavity defined by said lower sidewall assembly, said upper sidewall assembly and said segments;

(h) closing said tire mold while communicating said vacuum to said tire mold cavity;

(i) applying heat and pressure to said uncured tire for vulcanization thereof; and, (j) opening said tire mold for removal of said tire from said mold.

\* \* \* \* \*